July 18, 1961  W. G. WHELDON  2,992,796
STICK-FREE STATIC STABILITY AUGMENTER FOR AIRPLANES
Filed Nov. 24, 1954

INVENTOR:
Wilbert G. Wheldon
By Herbert E. Mdeal
His Patent Attorney

United States Patent Office 2,992,796
Patented July 18, 1961

2,992,796
STICK-FREE STATIC STABILITY AUGMENTER FOR AIRPLANES

Wilbert G. Wheldon, Portuguese Bend, Calif., assignor to Northrop Corporation, a corporation of California
Filed Nov. 24, 1954, Ser. No. 470,921
5 Claims. (Cl. 244—76)

The present invention relates to airplanes, and more particularly, to a stick-free static stability augmenter for use with a control stick force producer in a power-operated surface control system.

Basically, it is desired that for static (one "g") flight conditions, an airplane should require a greater push force on the control stick or column as the airspeed increases. Such an airplane is said to possess static stick-free stability. This condition is normally achieved by an airplane in which a greater downward deflection of the elevator is required to attain greater one "g" speeds.

However, due to such causes as a center of gravity position which is too far aft, or to compressibility changes to the airplane's aerodynamic pitching moment characteristics, it may turn out that this favorable gradient of elevator position versus airspeed no longer exists. In this event the favorable stick force gradient may become neutral or even adverse.

It is an object of this invention to provide static stick-free stability in an airplane not having this characteristic in normal circumstances. A further object is to provide any degree of static stick-free augmentation desired.

In airplanes designed for flight in or through the transonic speed range, for example, large changes in stability are always evident at certain speeds or attitudes. These characteristics for a particular airplane may be accurately determined, and the need for predetermined corrective measures during particular special times is realized. Hence, it is another object of the present invention to provide static stick-free stability augmenter means having a restricted or predetermined range of effectiveness only.

It is desirable that an airplane be provided with the means by which the pilot can set the elevator (or other aerodynamic longitudinal control device) at a given position and subsequently to reduce to zero the amount of manual effort which he must exert to maintain that position. Such a process is referred to as "trimming" the airplane. In airplanes having irreversible power operated control surfaces, stick forces must be produced artificially. In such airplanes, trimming operations are now commonly accomplished by neutralizing the control stick at a new position to thereby directly reposition the main control surface. This is done by adjusting a linkage between the stick and the artificial force producer supplying stick "feel." Still a further object of this invention is to provide means in a control surface trim system to automatically regulate the stick force in a manner giving the desired static stick-free stability.

Other objects and advantages will be apparent from the detailed description of preferred apparatus forming a later part of this specification.

Briefly, the present invention comprises an actuating mechanism connected in the link between the pilot's control element and the control element force producer. The actuating mechanism is preferably responsive to airspeed changes to change the pilot's stick force at any given position, resulting in a greater push force required for maintaining one "g" flight at a higher airspeed. This mechanism directly affects the control stick always in the same direction, whether at neutral or on either side thereof. Means can be provided to make the mechanism effective only through a predetermined range of airspeeds where augmentation may be necessary. An airspeed-actuated device may be included directly in the force connecting link to change its length, or a power-driven motor controlled by a Mach meter or similar device can be employed.

My invention will be more fully understood by reference to the following detailed description of specific embodiments illustrated in the accompanying drawings.

Figure 1:
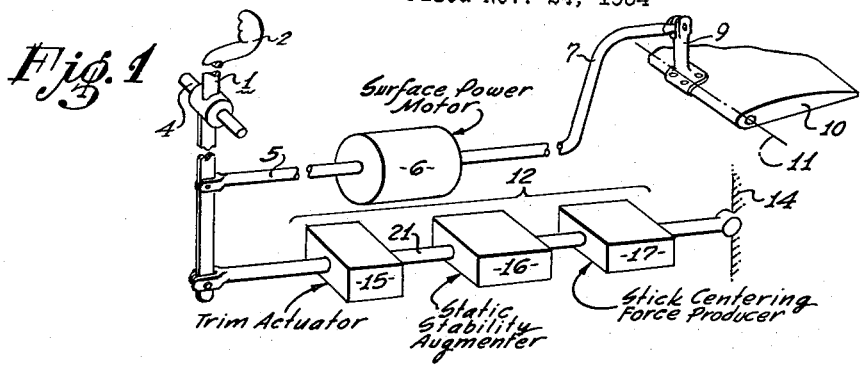
FIGURE 1 is a diagram of an airplane control stick connected to move a control surface, and the connection thereto of a force producer and trim system, showing where the present augmenter may be positioned.

Referring first to FIGURE 1, an airplane control stick 1 having a handle 2 is mounted on a lateral pivot axis 4 in the craft for fore-and-aft motion. Below pivot axis 4, a control shaft 5 is pivotally connected to the stick 1 and extends at a right angle toward the rear to operate a surface power motor 6. Substantially no tension nor compression is required in shaft 5 to achieve actuation of the motor 6. Output rod 7 of motor 6 acts directly on a horn 9 of an elevator surface 10 to move the elevator up and down about a forward hinge line 11. This is typical of an irreversible full power operated control system.

Also connected to the lower part of control stick 1 is a composite force producer system link 12. As shown in FIGURE 1, three units are attached in series and the ends of the series combination are pivotally connected to the stick 1 and airframe 14, respectively. These units are a trim actuator 15, static stability augmenter 16, and stick centering force producer 17. It makes no difference in what order the three units are connected in the link 12, as far as their result or effect upon the control stick 1, since they operate independently and additively.

The force producer 17 provides a neutral position of the control stick dependent upon the length of the trim actuator 15 and augmenter 16. On either side of neutral, the stick 1 will have to resist a restoring force in accordance with the characteristics of the force producer 17.

To change the trim setting of the elevator 10 for different flight conditions, the pilot manually selects operation of the trim actuator 15 in the desired direction so that a new "hands off" stick position results in a correspondingly new position of the elevator 10, thus trimming the airplane.

For descriptive purposes, assume now that the airplane possesses neutral stick-fixed stability, i.e., no change in elevator position is required to maintain one "g" flight at a higher airspeed than that where the stick force was trimmed. Under these conditions, an increase in airspeed gives no change whatsoever in stick position or stick force to maintain the one "g" or level flight, and this is undesirable by present standards, as explained above. However, it can be seen that if an increase in airspeed is made to result in a lengthening tendency of the link 12 containing the force producer 17, a tendency toward rearward motion will be exerted on the upper portion of the control stick 1. Therefore, a greater forward push will be required on the stick handle 2 to maintain the elevator position unchanged, and thus an amount of static stick-free stability is returned, and the pilot feels the airplane responding naturally.

Figure 2:
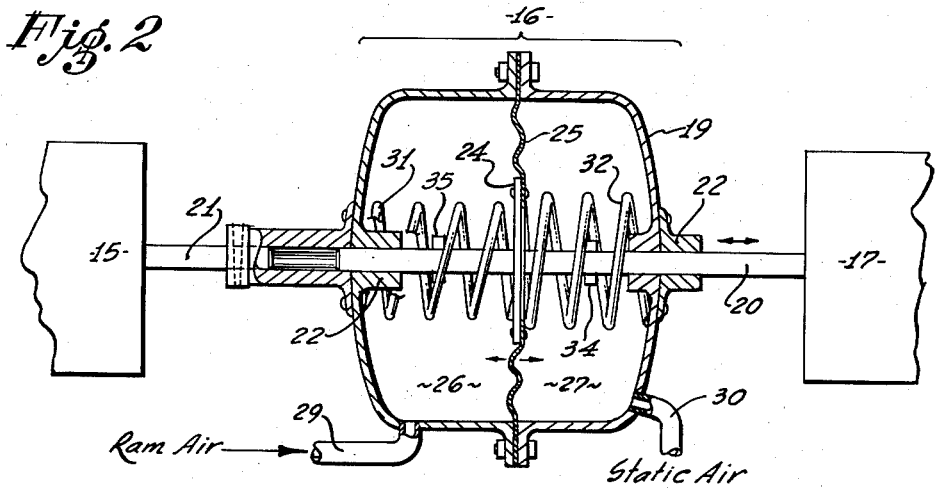
FIGURE 2 is a diagrammatic view of the portion of force producer linkage, containing an airspeed-responsive expansible bellows assembly shown in longitudinal section.

A means for accomplishing this desired condition is shown in FIGURE 2. Here, the static stability augmenter 16 comprises an expansible bellows assembly having a casing 19 and an extendable rod 20. The casing 19 is firmly attached at its left end to link portion 21 and the rod 20 is likewise attached to the unit of the link extending in the other, right-hand, direction. In this particular representation, the latter unit is the force producer 17. Rod 20 is slidably supported in two bearings 22 fixed to the casing 19.

Within the casing 19, rod 20 carries a central extending member 24 to which is sealed the inner edge of a flexible diaphragm 25. Outwardly, diaphragm 25 is sealed to the casing wall, thus dividing the interior of casing 19 into two compartments 26 and 27. Compartment 26 is connected to a source of ram air pressure occurring when the airplane is in flight, by ram air pipe 29. Second compartment 27 is preferably connected to a source of ambient static pressure by static air pipe 30. A first spring 31 surrounds rod 20 inside casing 19 and bears on member 24 from the left side. Similarly, second spring 32 bears on member 24 from the right. A high speed stop 34 may be fixed on rod 20 a predetermined distance toward the right end of casing 19 from central member 24, and a low speed stop 35 may similarly be fixed on rod 20 a predetermined distance toward the left end of casing 19 from member 24.

The augmenter 16 is pictured in FIGURE 2 with diaphragm 25 in some intermediate position corresponding to a certain assumed airspeed. In operation, the difference in pressures in compartments 26 and 27 acting on diaphragm 25 is balanced by the difference in forces exerted by the two springs 31 and 32 at a certain overall length of the bellows assembly. When airspeed is increased, for example, the higher pressure thus caused in ram air compartment 26 will move diaphragm 25 and rod 20 to the right far enough to cause a new spring differential force sufficient to stop rod 20 at a new, longer, position corresponding to the increased airspeed. As mentioned above, this operates against the force producer 17 to tend to move control stick handle 2 to the rear in the absence of any change of pilot force applied. Of course, the amount which the bellows assembly was lengthened will have been purposely too far for the pilot to allow the elevator to deflect upwardly, so that he will meet the aft-moving tendency of the stick handle 2 with a greater forward push force, thus keeping the elevator 10 in the proper position, and effectively displacing the force producer 17 against its stick restoring force.

In a like manner, it will be seen that a decrease in airspeed will cause a shortening of the augmenter 16 and a consequent reduction of forward push (or increase of pull) on the stick handle 2. This operation as described will be the same regardless of which side of neutral the control stick 1 may be on, at any time. In other words, the direction of augmenter-produced force change on the stick is always correct for all circumstances.

Springs 31 and 32 preferably have a relatively high spring constant (and may be preloaded) so that normal piloting movements of the control stick 1 will not result in play or lost motion between the stick and force producer 17.

Figure 3:
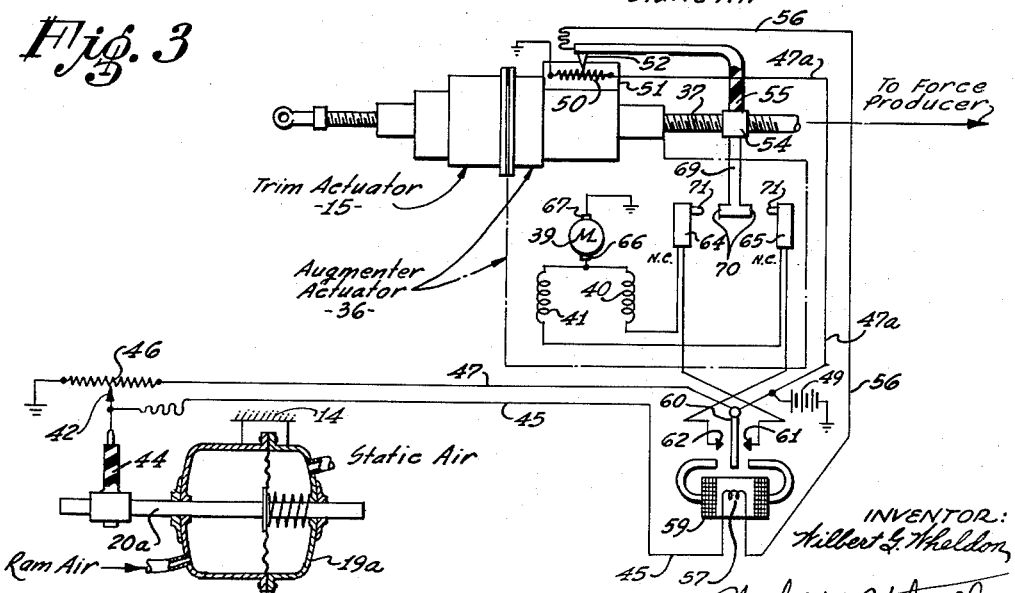
FIGURE 3 is a schematic diagram of an electrically operated airspeed-controlled actuator constructed in accordance with the present invention and adapted for installation in the stick force producer connecting mechanism.

Another static stability augmenter apparatus which may be used if desired is shown in FIGURE 3. In this drawing, an augmenter actuator 36 is mounted back-to-back with the trim actuator 15, and has a threaded extendable shaft 37 adapted to attach to the force producer 17. The augmenter actuator 36 includes a reversible electric motor 39 driving the threaded shaft 37 by means of suitable gearing (not shown). Electric motor 39 is preferably of the D.C. type provided with reversing field windings 40 and 41. Rotation of the motor in one direction will shorten the augmenter actuator 36 length, and rotation in the other direction will lengthen this link to change the stick-free position of the control stick 1.

An airspeed measuring unit in FIGURE 3 comprises a bellows casing assembly 19a functioning in the same manner as the one in FIGURE 2. However, the unit in the system of FIGURE 3 can be of much smaller power. Casing assembly 19a is fastened rigidly to airframe structure 14, and the casing rod 20a carries a potentiometer speed contact 42 insulated from the rod by insulating block 44.

Potentiometer speed contact 42 is connected directly to a speed contact wire 45, and is positioned to be moved over a speed potentiometer winding 46 having one end thereof grounded. The other end of potentiometer winding 46 is connected by power wire 47 to the ungrounded side of a power source 49, such as a battery, and also by paralleling power wire 47a to one end of a link potentiometer winding 50 attached to the augmenter motor housing 51. A link contact 52 is movable over link potentiometer winding 50 and is supported on a fitting 54 of the threaded shaft 37 by an insulator 55. Link contact 52 is connected to a link contact wire 56.

Thus, the position of link contact 52 on link potentiometer winding 50 will be in accordance with the length of augmenter actuator 36 as determined by the amount of extension of threaded shaft 37, and the position of speed contact 42 on speed potentiometer winding 46 will be in accordance with airspeed.

Speed contact wire 45 and link contact wire 56 are connected to opposite respective ends of a relay winding 57 on a polarized relay 59 having its movable switch blade 60 connected to the ungrounded side of power source 49. Opposite blade contacts 61 and 62 on polarized delay 59 are respectively connected to a normally closed low speed limit switch 64 and a normally closed high speed limit switch 65. Both switches are of the spring-loaded type which snap closed when released. Low speed limit switch 64 is then electrically connected to the "retracting" field winding 40 of electric motor 39, and high speed limit switch 65 is wired to the "extending" field winding 41. The other ends of field windings 40 and 41 are joined together and to one brush 66 of motor 39, the other brush 67 being grounded.

Limit switches 64 and 65 are preferably adjustably mounted on the augmenter housing 51. In operation, they are fixed relative to the housing 51. A switch actuating arm 69 is carried by fitting 54 on threaded shaft 37 and moves back and forth with the shaft. Dual operating heads 70 on arm 69 are positioned to physically contact and operate respective actuating plungers 71 on the limit switches at any desired relative position of the threaded shaft 37. In some instances, the limit switches 64 and 65 may be omitted entirely, and the polarized relay contacts 61 and 62 then wired directly to their respective field windings 40 and 41.

In steady state operation, the outputs of the two potentiometers 46 and 50 at their movable contacts will be balanced and the switch blade 60 of polarized relay 59 will not close either blade contact 61 or 62. When, however, the airspeed changes, the output of the speed potentiometer 46 will be different from that of the link potentiometer 50 and the switch blade 60 will make contact with one or other of the opposite blade contacts, thus causing motor 39 to run in the direction desired to lengthen or shorten the augmenter actuator 36. As the extended distance of the threaded shaft 37 is changed, the output of the link potentiometer 50 will come to match the output of the speed potentiometer 46, and motor 39 will stop.

Thus, the composite link 12 will assume various lengths in accordance with airspeed, and the pilot's stick force will be varied in accordance with the amount designed to give optimum static stick-free stability. The operation is completely automatic.

It will be noted that the mechanism of FIGURE 3 provides absolute irreversibility of control, i.e., the augmenter actuator 36 will not change length under external forces applied along the composite link 12 from the stick to force producer 17. Therefore, stick force gradients are entirely dependent upon the force producer alone, even for abrupt maneuvers, since the force producer is always connected solidly to the stick 1.

The bellows rod stops and the limit switches described above give increased usefulness and versatility to the system as regards speeds of effectiveness. In some instances, high-performance aircraft have satisfactory stick handling and surface control qualities over the majority of their speed range, but unsatisfactory stability over a critical portion of this speed range. If it is desirable to augment the static stick-free stability only between the limits of 400 and 500 miles per hour, for example, then the stops 34 and 35 in the bellows casing 19 of FIGURE 2 can be set to limit the extremes of travel of the augmenter rod 20 accordingly. Or, the limit switches 65 and 64 in the motor circuit of FIGURE 3 can be positioned to open at the upper and lower speed limits, respectively, to interrupt the motor current. When one switch opens, however, the opposite switch remains closed, so that it is possible to operate the motor 39 back toward the center of its range at such time as control current in the polarized relay winding 57 reverses and actuates the switch blade 60 to energize the other motor field. Limit switches 64 and 65 can obviously be positioned and wired in different parts of the system to obtain equivalent results. If the bellows casing assembly 19a is not simultaneously used for some other purpose requiring it to function over the entire speed range, bellows rod stops similar to the ones in FIGURE 2 can be used to eliminate the limit switches entirely, if desired. Automatic or manual valves could also be used instead, located in the air lines to the bellows unit.

Alternately, various other and different well known types of airspeed measuring devices, or Mach meters, could be employed, to accomplish the same end result as the specific apparatus described herein.

It is thus seen that by utilizing the principles of the present invention, an airplane control system can be made to exhibit static stick-free stability even when the airplane as such would not normally possess it. By regulating the various factors of the augmenter system, such as the ratio of augmenter length variation per unit of airspeed change, any desired degree of static stick-free augmentation can be applied or added to the basic airplane response. The present arrangement of the augmenter in the force producer link is adaptable for use in any airplane having a power operated control system wherein trim is accomplished by adjusting the center point of an artificial stick force producer in relation to stick position. It is also suitable for pitch control systems having a "bobweight" type of stick feel response to normal accelerations, i.e., accelerations along the vertical axis of the airplane.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. In an airplane having a pilot's pitch control element, the combination comprising a control element force producer and an augmenter actuator connected in series between said control element and the framework of said airplane, said actuator comprising a reversible electric motor irreversibly connected to extend and retract an output rod thereof, and means for operating said motor to position said rod in accordance with airspeed of said airplane, said actuator being oriented in the direction to apply a "pitch up" force on said control element at increased airspeeds at all positions of said control element.

2. Apparatus in accordance with claim 1 wherein said latter means comprises an airspeed measuring device having a movable output member normally positioned in proportion to airspeed, synchronous control means for positioning said rod in accordance with said member, and at least one rod limit stop for preventing movement of said rod beyond a point corresponding to a predetermined airspeed within the speed range of said airplane.

3. Apparatus in accordance with claim 1 wherein said latter means comprises an airspeed measuring device having a movable output member positioned in proportion to airspeed, a pair of potentiometers supplied with a constant voltage, a movable contact of one potentiometer carried by said member, a movable contact of the other potentiometer carried by said rod, and double-throw polarized relay means with its output connected in a power supply circuit of said motor and its input connected to said movable contacts, whereby said motor is automatically operated to position said rod in proportional agreement with the position of said member.

4. Apparatus in accordance with claim 3 including a normally closed momentary-contact limit switch electrically connected in series with at least one of the circuits of said relay means, and means cooperating with one of said movable contacts for operating said limit switch at a predetermined point within the speed range of said airplane, whereby said augmenter is adjustably operative only through a restricted portion of said airspeed range.

5. An airplane force producer system comprising a pilot's elevation surface control element, a control element centering force producer and a static stability augmenter connected in series relation between said control element and the airframe structure in an airplane, said augmenter comprising an actuator having relatively movable external connection members, and airspeed-actuated means for controlling the relative positions of said members in proportion to the airspeed of said airplane, said means being drivingly related to said members in proper orientation to tend to move said control element in an up elevation direction with an increase in airspeed irrespective of the position of said control element.

References Cited in the file of this patent

UNITED STATES PATENTS

| | | |
|---|---|---|
| 2,169,982 | Von Manteuffel | Aug. 15, 1939 |
| 2,445,343 | Tyra | July 20, 1948 |
| 2,542,202 | McGuire | Feb. 20, 1951 |
| 2,652,994 | Feeney | Sept. 22, 1953 |
| 2,719,684 | Peed | Oct. 4, 1955 |
| 2,797,882 | Servanty | July 2, 1957 |